United States Patent [19]
Kolbe

[11] 3,944,246
[45] Mar. 16, 1976

[54] VEHICLE BANKING ARM CONSTRUCTION

[76] Inventor: Joachim Kolbe, 5126 Haskell Ave., Encino, Calif. 91316

[22] Filed: Sept. 27, 1974

[21] Appl. No.: 509,943

[52] U.S. Cl. .......................... 280/112 A; 280/124 B
[51] Int. Cl.² ......................................... B60G 11/60
[58] Field of Search ............ 280/112 A, 124 B, 96.2

[56] References Cited
UNITED STATES PATENTS

| | | | |
|---|---|---|---|
| 3,726,542 | 4/1973 | Kolbe | 280/112 A |
| 3,826,514 | 7/1974 | Kolbe | 280/112 A |

Primary Examiner—Philip Goodman
Attorney, Agent, or Firm—Andrus, Sceales, Starke & Sawall

[57] ABSTRACT

In a vehicle banking arm suspension structure the superstructure supported end of each banking arm employing a flexible torsion spring member and multiturn cushions, is carried by an intermediate mounting member which serves to simultaneously windup and bring under pressure all resilient members placed within the banking arm, preferably assembled in advance of connecting the mounting member to the superstructure.

6 Claims, 5 Drawing Figures

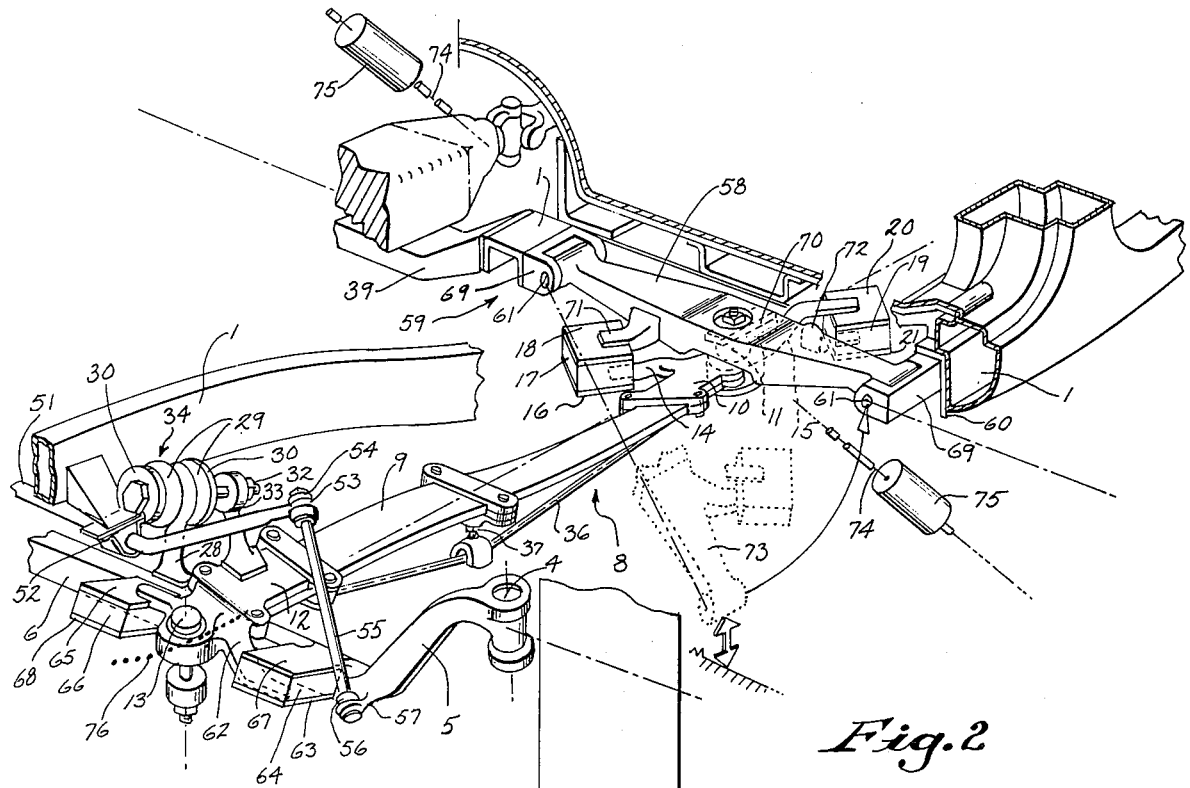
Fig.2
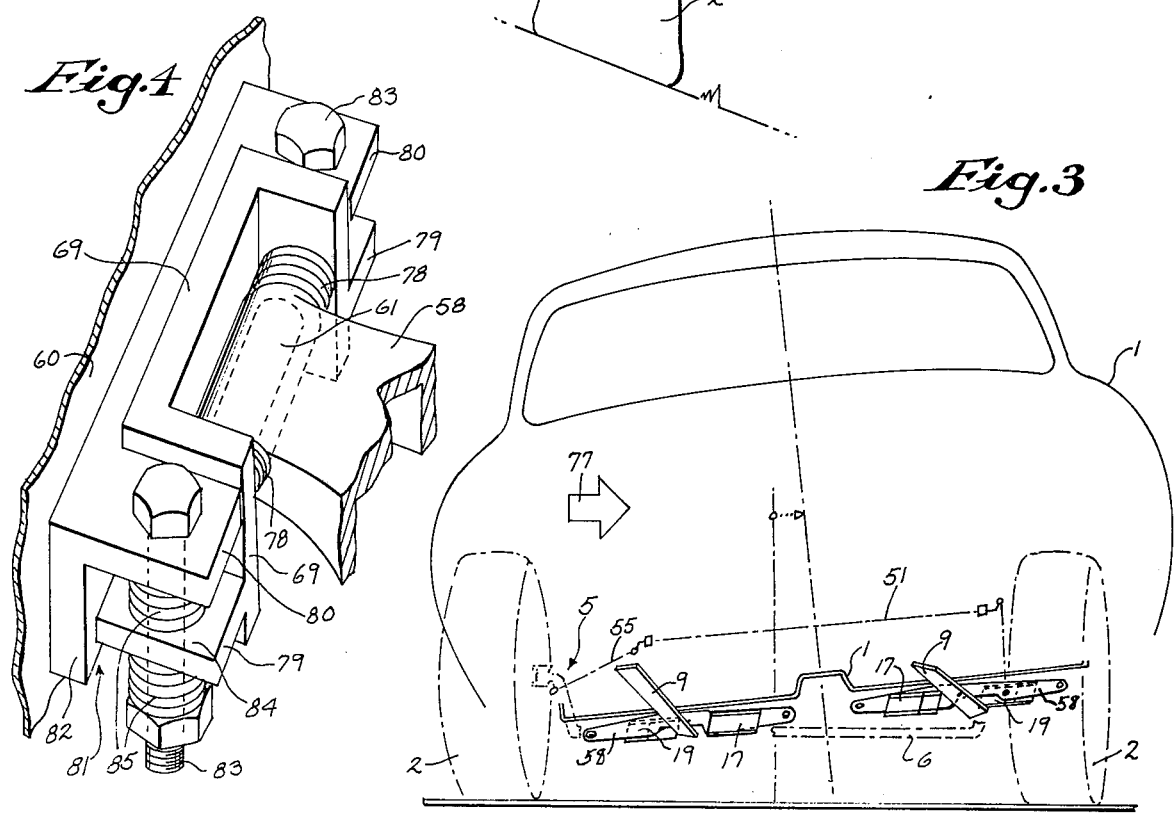
Fig.4
Fig.3

VEHICLE BANKING ARM CONSTRUCTION

CROSS-REFERENCES TO RELATED APPLICATIONS

This application refers to descriptive material disclosed in the U.S. Pat. No. 3,,826,514 (Single Leaf Truss), and applications Ser. No. 324,754, applied for on Jan. 18, 1973 (Torque Control Pivot), Ser. No. 451,744 applied for on Mar. 18, 1974 (Cushion Pairs) and Ser. No. 509,830, applied for on Sept. 27, 1974, (Flat Cushions).

BACKGROUND OF THE INVENTION

1. Field of the Invention:

This invention pertains to the suspension structure for automotive vehicles and the like, and in particular to an improved vehicle roll banking arm construction for resiliently supporting the superstructure of curvebank cars to secure inward leaning of the superstructure during curve ride of the vehicle. The subject matter of this invention pertains to the mounting process of connecting the banking arms to the vehicle superstructure while controlling and gradually overcoming the resistance of the related resilient means incorporated within the banking arms whereby the resulting forces are finally balanced by the essentially static height weight of the superstructure.

2. Description of the Prior Art:

The development of a practical inexpensive vehicle suspension linkage system causing the superstructure to lean inwardly during curve ride has been the work of this inventor over a period of many years and the subject matter of many U.S. and Foreign Patents issued to him.

Citing only those patents which are still in force and which might assist in the better understanding of the subject matter, they include the following:

U.S. Pat. No. 2,739,823 3/27/56 (Power Assist Banking)
U.S. Pat. No. 2,820,646 1/21/58 (Banking Shackles)
U.S. Pat. No. 3,181,883 5/4/65 (Rubber Cushions)
U.S. Pat. No. 3,556,553 1/19/71 (Polyurethane)
U.S. Pat. No. 3,726,542 4/10/73 (Rigid Front Axle)

In all of the banking suspension structures disclosed in the patents cited above, the method used of connecting the structures to the related superstructure districts was one of gaining windup degrees step by step with intermediate blocking against loss of windup degrees.

There has been a need in this development for a more practical method of assembly than that employed with these former structures.

SUMMARY OF THE INVENTION

In carrying out the present invention, a so-called windup arm is placed between the superstructure supported end of a related banking arm and the superstructure itself. This windup arm extends substantially transversely of the vehicle and below its superstructure floor from the floor center section outwardly towards the nearest lower body side rail. Each end of the windup arm is bolted to its respective vehicle body support by a longitudinally extending easily removable connecting bolt. The windup arms serve as a means to set the resilient members, forming a part of the related banking arms, under pressure up to the degree needed to lift the vehicle superstructure into its designed static height position. Before the pressure activation of the windup arms as described hereinafter is begun, all structural members of the whole front and rear suspension assembly may first be interconnected with their neighboring members, the windup arms and with their respective axles to form the banking arms thereafter.

The insertion of the multiturn cushions can easily take place during the assembly process, since the respective operating and carrying plates will stary parallel to each other.

The suspension assemblies may now be positioned below the superstructure, and, depending on the rotational direction chosen for the selected leaf spring windup typical for the planned suspension, one end of the windup arm will be connected by the respective bolt to the superstructure, while the respective other end of the windup arm will take a position inclined, hanging downwardly to the work floor at a sufficiently large angle to cover the full range of said desired systems windup. The lifting of the respective other end of the windup arm by means of a car jack into a position securing an essentially horizontal arm position, makes the insertion of the respective second connecting bolt into the related windup arm end possible. A substantially simultaneous insertion of the two connecting bolts for at least one pair at a time of the related vehicle banking arms eliminates the need for blocking any side pull of one banking arm caused by the other, during the mounting process.

BRIEF DESCRIPTION OF THE DRAWINGS

The accompanying drawings illustrate the best mode presently contemplated of carrying out the invention.

In the drawings:

FIG. 2 is a perspective detailed view of a left-hand front end banking arm shown as it fits into the related banking arm curvebank geometry pattern, selected for this invention.

FIG. 3 is a schematic front elevation of the front end of the vehicle having its superstructure mounted as shown in FIG. 1 and turned into a roll banked position, and in particular illustrating the windup arm mounting members positioned in accordance with this invention.

FIG. 4 is a perspective detailed view of an end connection between a windup arm and the superstructure and comprising adjustment means for final positioning, controlling both wheel base and degree of torsional windup within the banking arm suspension system.

DESCRIPTION OF THE PREFERRED EMBODIMENT

Referring to the "Cross References to Related Patent Applications" cited above, both the "Cushion Pairs" and "Flat Cushions" constructions are especially suited for the application of the windup arm principle of this invention. The preferred embodiment illustrated and described hereinafter is that related to the "Flat Cushions" disclosure.

Figure 1:
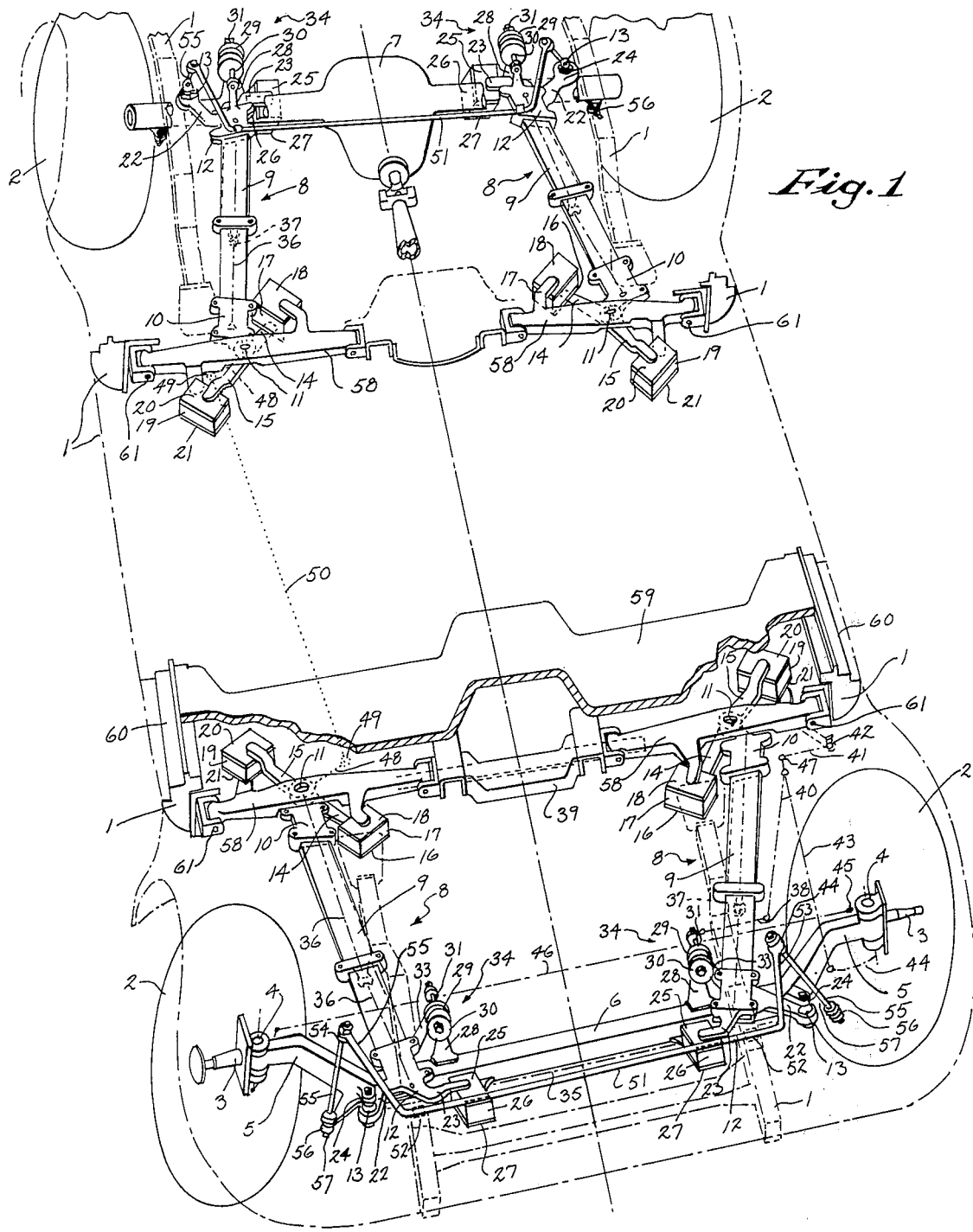
FIG. 1 is a perspective view of a vehicle chassis embodying the invention and showing the superstructure in a normal upright position.

FIG. 1 illustrates a vehicle body or superstructure having a chassis or body support frame 1 supported by the wheels 2 on the road. The wheels are arranged in pairs, one pair at the front and the other pair at the rear end of the vehicle. The wheels of each pair are disposed on opposite sides of the superstructure and are equally spaced from the longitudinal, vertical center plane of the vehicle.

The front wheels 2 are each, in the modification illustrated, carried by a wheel spindle member 3 pivotally connected by a kingpin 4 to the outer, elevated end 5 of a rigid axle 6 extending transversely between the front wheels 2.

The rear wheels 2 are carried by a rigid axle housing structure 7. The front axle 6 and the rear axle housing structure 7 each support the respective outer ends of a related pair of roll banking arms 8 which in turn at their inner ends support the frame 1. Each banking arm comprises a torsionally operated leaf spring 9, preferably in form of a single leaf connected at its inner end by a support bracket 10 supporting the banking arm ball and socket joint 11, which in effect connects said end of the banking arm 8 to the frame 1. The outer end of the respective leaf spring 9 is held by the support bracket 12 for the support of the banking arm ball and socket joint 13, which connects said end of the banking arm 8 to the rigid axle 6 in the front, and to the rigid axle housing structure 7 in the rear of the vehicle, respectively.

Each support bracket 10 extends substantially horizontally and diagonally away from the related ball and socket joint 11 in both directions along a straight axis line, forming two support half arms 14 and 15, whereby the half arm 14 extends from the ball joint 11 inwardly towards the front wheel located at the other side of the vehicle, while the other support half arm 15 extends along the extension of the support half arm 14 outwardly and backwardly towards the outer center district of the vehicle.

Each support half arm 14 is shaped at its end into an operating plate 16, which supports from below a multiturn cushion 17 of substantially rectangular but preferably somewhat bent sectional outline and positioned essentially parallel to the roadbed and inclined to the longitudinally and vertically extending center plane of the vehicle at an angle of approximately 45° as measured between its long side and the vehicle center plane. An upper carrier plate 18 covers the multiturn cushion 17 from above and is in effect carried by a part of the frame 1.

A second multiturn cushion 19, supported from above by an operating plate 20 and carried from below by a carrier plate 21 is positioned at the end of the support half arm 15 with all related short edges of the cushion 19 extending parallel to those of the multiturn cushion 17. The related longitudinally extending edge lines of the cushions 17 and 19 have their bent sectional outlines arranged in opposite directions relative to each other. The carrier plate 21 is supported from below in effect by a part of the vehicle frame 1. The distance between the centers of the multiturn cushions 17 and 19 is approximately one-third to one-half of the distance between the ball joints 11 and 13, with the ball joint 11 preferably placed at an equal distance between the cushions 17 and 19. The cushions 17 and 19 are referred to hereinafter as "bent cushion pairs."

Each support axle bracket 12 is connected in its central section to the end of the torsionally operated leaf spring 9 and extends substantially horizontally and transversely away from said connection in both directions forming two support half arms 22 and 23, whereby the half arm 22 extends outwardly towards the nearest wheel 2, and carries at its end the ball and socket joint 13 which is connected to the bracket 24 supported by the respective rigid axle structure 6, 7. The half arm 23 is shaped at its end into an operating plate 25 against which the multiturn cushion 26 rests from below. A carrier plate 27 supports the multiturn cushion 26 from below and is itself carried by the respective vehicle axle structure 6, 7.

The multiturn cushion 26 extends in the modification illustrated in FIG. 1 as appearing in side view with its longer side longitudinally of the vehicle and is positioned inclined to the road at an angle of approximately 30 degrees, with its lower edge of its lower surface placed somewhat farther away from the respective axle 6, 7, than its respective upper edge. Such positioning of the cushion results in a wind-down of the spring leaf 9 when located on the curve outside during curve banking. A change in inclination of the multiturn cushion 26 from one directed to the center district of the vehicle to one directed towards the end section of the vehicle would result in additional leaf windup.

Each axle 6 and 7 carries an upwardly directed arm 28 which supports on its ring formed upper end two bushings of resilient material 29 which are resting between the two enclosure discs 30 and which are kept under pressure by a bolt 31 with corresponding regulatory end nuts 32. Each support bracket 12 also carries an upwardly directed arm 33 which pivotally receives at its upper end the extended bolt 31. The pivotal assembly as a whole constitutes a so-called torque control pivot 34 which is selectively positioned to control any tendency of the related axle 6, 7, to rotate about its axis line 35 interconnecting the centers of the respective banking arm ball and socket joints 13, located on either side of the vehicle and supported by the related axles in response to vertically directed wheel load reaction forces. Torque control pivots and their functions are disclosed in the pending U.S. application Ser. No. 324,754, referred to above.

The tendency of the torsionally operated leaf spring 9 to bend in reaction to forces present in the system is overcome or controlled by the addition of a truss cable 36 arranged below and extending between the respective support brackets 10 and 12 for each spring leaf, whereby a truss column 37 is positioned between the spring leaf 9 and the truss cable 36. Single leaf truss structures and their functions are disclosed in the U.S. Pat. No. 3,826,514, referred to above.

FIG. 1 further illustrates, schematically only, the front wheel steering linkage as it is recommended for a curvebank vehicle comprising a rigid front axle. The linkage comprises the horizontally extending lever 38 which might be considered the Pitman arm of the steering gear mechanism enclosed by a gear housing (not shown) mounted on the frame 1 to locate the arm as illustrated.

The outwardly extending lever arm 38 is pivotally connected at its outer end to a tie rod 40 supported by the lever arm 41 which is pivotally supported by the vertically extending pivot 42 carried in effect by the frame 1. The lever arm 41 also carries the backward end of the steering drag link 43 whose forward end is connected to the spindle arm 44, which extends into the steering arm 45. A cross steering tie rod 46 extends between the steering arm 45 and the corresponding steering arm located on the other side of the vehicle. All tie rod and drag link ends are also connected to their respective support arms by the ball and socket joints 47.

Each of the two support brackets 10 located on one side of the vehicle also carry an arm 48 extending sidewardly in a direction opposite to each other in relation to the two end sections of the vehicle, whereby each of said arms carries a ball and socket joint 49 on its free end, supporting the ends of a front to rear tie rod 50 arranged to secure lateral operation in unison of the front and rear pairs of banking arms 8 during the roll turn of the superstructure into a banked position.

Each vehicle frame end supports a sway bar 51 as illustrated in FIGS. 1 and 2 in bushings 52 with the longitudinally extending sway bar arms 53 connected by the resilient bushings 54 at their upper ends to the sway bar shackles 55 which are connected by the resilient bushings 56 at their lower ends to the respective axle carried support brackets 57.

As stated above, the rearward ends of the vehicle front pair of banking arms 8 and the forward ends of the vehicle rear pair of banking arms 8 are "IN EFFECT" connected to the vehicle superstructure frame. The structural execution of these banking arm-to-superstructure connections and their functions within the banking suspension system are considered the subject matter of this invention. FIG. 1 illustrates the banking arm ball and socket joint 11 as well as the carrier plates 18 and 21 for each of the four vehicle banking arms as connected to its own newly introduced windup arm 58.

This windup arm 58 extends, as stated previously, substantially transversely of the vehicle and below its superstructure floor section 59 from the central part 39 of frame 1 outwardly toward the nearest lower body side rail 60 of frame 1. Each end of the windup arm 58 is shown as secured to its respective vehicle body support 39, 60 by a longitudinally extending easily removable connecting bolt 61. The related carrier plate 18 transfers the load force exerted on it by the related multiturn cushion 17 from below to the windup arm 58, and the related carrier plate 21 transfers the load force exerted on it by the related multiturn cushion 17 from below to the windup arm 58, and the related carrier plate 21 transfers the load force exerted on it by the related multiturn cushion 19 from above to the windup arm 58. Both forces combine to create a rotational torque about the ball and socket connection 11 disposed generally centrally of the windup arm.

FIG. 2 is a perspective view of the left-hand front banking arm illustrated in FIG. 1, wherein the functioning and service rendered by the newly introduced windup arm 58 is more clearly graphically explained and wherein outlines related to the geometry pattern as well as a variation of the connection between the forward end of the banking arm and the related rigid front axle are added. Numerals identical to those given to structural elements shown in FIG. 1 have been applied in FIG. 2.

The connection shown in FIG. 2, between the forward end of the banking arm 8 and the rigid vehicle front axle 6 comprises a pair of polyurethane based multiturn cushions similar to those disclosed in the application "Cushion Pairs," referred to above. The support bracket 62 is carried by the ball and socket joint 13 which is in turn carried by the front axle 6. Bracket 62 supports an outer operating plate 63 supporting the multiturn cushion 64 from below, and an inner operating plate 65 supporting a multiturn cushion 66 from above. The respective cushion carrier plates 67 and 68 are carried by the front axle 6. Having in this arrangement all vehicle superstructure supporting forces operative in a vertical direction guided through four approximately 2.5 inches thick layers of polyurethane per banking arm, and only the forces active in a horizontal plane such as the drive created forces guided through the two related ball and socket joints per banking arm, secures an excellent and nearly completely metal free double layer insulation between the superstructure and the roadbed.

As shown in FIG. 2, removable connecting bolts 61 are carried by the pivot support yoke brackets 69. A cross plate 70 provided with a tapered hole is carried within the central section of the windup arm 58 and carries the ball and socket joint 11. The carrier plate 18 against which the multiturn cushion 17 rests from below carries the windup arm bracket 71 which in turn is carried by the windup arm 58. The carrier plate 21 against which the multiturn cushion 19 rests from above is carried by the windup arm bracket 72 which is also carried by the windup arm 58. The banking arm ball and socket joint 11 and the two windup arm brackets 71 and 72 thereby constitute the means of connecting the related end of the banking arm 8 "in effect" to the vehicle superstructure.

The windup arm 58, once bolted and rigidly secured to the superstructure cannot be considered a part of the related banking arm 8 anymore. It is incorporated into the vehicle frame or body structure as a means to simultaneously bring all related banking arm and axle structures and the resilient means carried by them into the vehicle static height position and under the pressures. The arrangement greatly simplifies the mounting and dismounting of the curvebank car suspensions, a task previously done on a step by step basis, whereby initial pressures created by earlier steps interfered with and repeatedly brought out of alignment part sections of the related banking arm, calling for outside initiated counter pressures and intermediate blocking procedures. Where replacement of parts became necessary the same difficult time consuming and expensive process was called for, with unwanted yieldings, sometimes constituting an element of danger for a mechanic not familiar with the structure as a whole.

As FIG. 2 indicates, when the superstructure is suspended from above, the removal of the outer connecting bolt 61 will permit the outer end of the windup arm 58 to be lowered, turning around the inner connecting bolt 61 until the arm 58 is moved into a downwardly inclined position, with the spring leaf 9 completely freed of torsional windup and all multiturn cushions having lost their compression. At that time, the removal of any or all multiturn cushions or banking arm ball joints 11, 13, or their re-insertion before re-windup can take place free from pressures. Lifting the low end of the windup arm as for instance with use of a hydraulic car jack, and inserting the respective connecting bolt especially if done on both sides of the vehicle simultaneously will avoid the build-up of any asymetrical pressures. Complete pre-assembly of both pairs of banking arms 8 can be done on work tables, including their inner bolt connections to the related windup arms 58.

Where the selected suspension structure calls for a windup of the end of the leaf spring 9 near its superstructure supported end in a clockwise direction, as viewed by the driver, the inner end of the windup arm has first to be connected by the respective bolt 61 to the superstructure. The outer end of the windup arm, shown as hanging downwardly in dotted outline 73 in FIG. 2 will then be lifted to bring the arm 58 into the desired horizontal position.

When serving a suspension system such as that disclosed in the application "Cushion Pairs," referred to above, wherein for the left front banking arm the windup of the related leaf spring end is counter-clockwise, as viewed by the driver, the outer end of the related windup arm was first to be connected by the related bolt to the superstructure, with the inner end hanging down and to be lifted by outer pressure into the desired horizontal position.

The effective banking arm hinge axis 74 is shown in FIG. 2 by an upper and lower somewhat larger cylinder 75 and a number of small cylinders drawn all spaced along line 74. The banking arm 8 as a whole is designed to swing about the axis line 74 during curvebanking of the superstructure 1 relative to the axles 6 and 7, whereby the center of the banking arm ball joint 13 will travel, relative to the vehicle superstructure along the path 76 marked in heavy dotted outline.

FIG. 3 shows the superstructure 1 as pressed into the inwardly inclined position, such as during a turn of the vehicle to the right, and while under the side pressure from the centrifugal force as represented by the arrow 77. The positions taken by the leaf springs 9 are shown as following with their backward ends the combined roll and counter-roll motions of the superstructure 1 while the forward ends essentially maintain their position relationships to the front axle 6.

The shear deformation of the superstructure related and now windup arm 58 carried multiturn cushions 17 and 19 are shown as well as, schematically, the support brackets 10 extending from the related ball joints 11 sidewardly in both directions over the bracket half arms 14 and 15 to the upper and lower operating plates 16 and 20 and the lower and upper carrying plates 18 and 21 respectively.

The carrier plates 18 and 21 are, as described above, carried by the respective windup arms 58 which are shown as extending below the superstructure floor and bolted to the respective reinforced sections of the superstructure. The positions of the related sway bar 51 and the related sway bar shackles 55 are taken during the superstructure banking turn, are also shown schematically.

FIG. 4 is a somewhat schematic perspective view of a modified outer end connection between a windup arm 58 and a pivot support fork 69 designed to carry a related connecting bolt 61.

A number of bolt washers 78 are placed between the side sections of the pivot support forks 69 and the bearing ends of the windup arm 58. The pivot support fork 69 is shown to carry outer side plates 79 which are positioned a selected distance below the horizontally extending flange 80 of an angle beam 81 whose vertically extending flange 82 acts as a guide for the outer wall of the pivot support fork 69. The lift bolts 83 may be turned within the threaded hole 84 of the side plate 79, to lift or lower the support fork 69.

Selected bolt washers 85 are placed both above and below the outer side plates 79 to secure firm support for any selected position of the end bearing of the windup arm 58 both in a vertical and in a longitudinal adjustment depending on the numerical distribution of the washers 85 and 78 respectively. The angle beam 81 is firmly connected to the outer side rail 60 of frame 1 of the superstructure.

Lifting of the end bearing of the windup arm 58 positioned closest to the body side rail 60 will result in additional torsional windup of the leaf spring 9, lowering it will constitute reduction in windup of the spring. Both ends of each vehicle windup arm may be constructed to be position adjustable as desired. A great variety of positions will therewith be available to reposition and bring into exact alignment both the static superstructure height, the vehicle wheel base, and to adjust the superstructure to more or less one-sided loading.

The washers 78 and 85 as illustrated should be considered as somewhat schematic means. Shims, designed for easy change in position, threaded bushings, eccentric dual bushings and the like, are known in the art as similar adjustment means, applicable within the structure of this invention.

Figure 5:
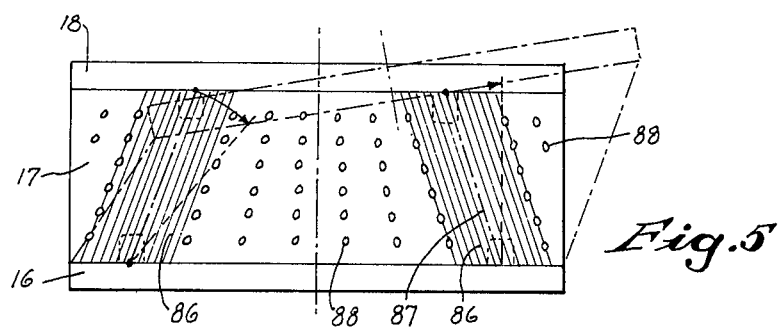
FIG. 5 is a side view of a multiturn cushion, provided with voids positioned to regulate the deformation of the cushion.

FIG. 5 illustrates a multiturn cushion such as shown in FIG. 2 and shaped by carefully placed voids provided in a polyurethane block of a high durometer hardness, in order to secure a rotational effect of the carrier plate 18 relative to the related operating plate 16, as is desirable for maximum effectiveness of over-all geometry pattern of the banking arm 8 of this invention. Two zones 86 extend along the inclined zone axis lines 87 forming a trapezoid with plates 16 and 18, are kept free of voids such as the selectively positioned holes 88 which are otherwise distributed throughout the cushion block to soften the remaining zones of the block and secure reduced resistance against shear deformation occurring within the block during the curvebank roll of the superstructure. The zones 86 will serve in effect as inclined links similar to the inclined shackles 55 of the sway bar 51 shown in FIG. 1. The zone axis 87 positioned on one end of the polyurethane block will erect itself into a fully upright position, the zone axis 87 positioned on the other end will lower itself with increased side inclination, permitting the related carrier plate 18 to take the desired inclined position.

Various other structural arrangements for the cushions may be employed to secure rotational side travel for the related cushions, one of which may secure a concave travel path, the other a convex travel path as explained in the application "Flat Cushion," referred to above.

With the incorporation of the multiturn cushions, constructed and shaped as described above, the related operating plates 16 and the carrier plates 18 can be positioned, together with the related multiturn cushions 17 parallel instead of inclined to the roadbed, as drawn in FIGS. 1 and 2. Reduced overall minimum height of the structure is the greatest advantage of such arrangement.

Various modes of carrying out the invention are contemplated as being within the scope of the following claims particularly pointing out and distinctly claiming the subject matter which is regarded as the invention.

I claim:

1. In a vehicle having a superstructure and a banking support for the superstructure connecting the superstructure at its forward end to a wheel spindle carrying wheel supported rigid front axle structure and at its rearward end to a rigid wheel supported rear axle structure, said banking support comprising a plurality of pairs of cooperating roll banking arms, each arm including a longitudinally extending torsionally operated resilient spring means connected by a separate support member and a ball and socket joint at one end to the superstructure and at the other end to the respective rigid axle structure, and side lever arms forming a part of said separate support members and bearing at their outer ends against respective resilient multiturn cushions disposed at the opposite ends of the resilient spring means and bearing against the related rigid axle structure at one end and the superstructure at the other end to effect the torsional activation of said spring means under static load from the superstructure and also under lateral shift forces from the superstructure resulting from curve ride, the improvement comprising the interposition of a windup arm structure placed between the superstructure supported end of each banking arm and the superstructure, each windup arm structure being removably connected at each end to the superstructure and supporting its corresponding banking arm ball and socket joint and multiturn cushion, to thereby provide torsional windup of the related banking arm resilient spring means and pressure application on all related multiturn cushions during the mounting process of the windup arm into the superstructure by first pivotally securing one end of said windup arm and thereafter pivoting said windup arm from an initially inclined position into the horizontal position, and thereafter securing the other end of said windup arm.

2. The construction of claim 1 and means to adjust the position of each said windup arm longitudinally of said superstructure.

3. The construction of claim 1 and means to adjust the position of each said windup arm vertically of said superstructure.

4. The construction of claim 1 and means to selectively adjust the position of each said windup arm longitudinally and vertically of said superstructure.

5. In a vehicle of the class described, a roll banking arm extending from the superstructure to a rigid axle structure and comprising a torsionally operated resilient spring means extending longitudinally of the superstructure, and a windup arm securing one end of said spring means to the superstructure, said windup arm constituting a rigid part of the superstructure after completion of the assembly therewith, and in which said windup arm extends generally transversely of the superstructure and is pivoted thereto at one end on an axis generally parallel to said spring with the opposite end of said windup arm hanging downwardly during initial assembly operations whereby pivotal movement of the windup arm upwardly to a position where its opposite end is secured to the superstructure effects a torsional prestressing of said spring means.

6. The method of assembly of a torsionally resilient roll banking arm between a vehicle superstructure and a rigid axle, comprising securing a transverse windup arm to the inner end of the banking arm, pivotally securing one end of said windup arm to the superstructure upon an axis generally parallel to the banking arm and with the windup arm hanging downwardly from said pivotal securement, then pivoting said windup arm upwardly to torsionally stress said banking arm, and finally securing the opposite free end of said windup arm to the superstructure with the pre-stressing of said banking arm conditioning the same for cooperation with a like banking arm in support of the superstructure.

* * * * *